(12) United States Patent
Lee

(10) Patent No.: US 11,520,348 B2
(45) Date of Patent: Dec. 6, 2022

(54) METHOD FOR DRIVING ROBOT BASED ON EXTERNAL IMAGE, AND ROBOT AND SERVER IMPLEMENTING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 16/555,963

(22) Filed: Aug. 29, 2019

(65) Prior Publication Data

US 2019/0384317 A1 Dec. 19, 2019

(30) Foreign Application Priority Data

Jun. 7, 2019 (KR) .................. 10-2019-0067516

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G05D 1/0276* (2013.01);
(Continued)

(58) Field of Classification Search
CPC .. G05D 1/0246; G05D 1/0088; G05D 1/0289; G05D 1/0276; G06N 3/08; H04L 67/125
See application file for complete search history.

(56) References Cited

U.S. PATENT DOCUMENTS 4,779,203 A * 10/1988 McClure .............. G05D 1/0234
348/114
10,394,234 B2 * 8/2019 Salour .................. G05D 1/0289
(Continued)

FOREIGN PATENT DOCUMENTS

KR    10-1480774 B1    1/2015
KR    10-1776823 B1    9/2017
(Continued)

*Primary Examiner* — Hunter B Lonsberry
*Assistant Examiner* — Harrison Heflin
(74) *Attorney, Agent, or Firm* — Birch, Stewart, Kolasch & Birch, LLP

(57) ABSTRACT

Disclosed herein are a method for driving a robot based on an external image, and a robot and a server implementing the same. In the method, and the robot and server implementing the same, drive of a robot is controlled further using external images acquired by camera modules installed outside the robot. To this end, a robot according to an embodiment of the present disclosure includes a communication unit configured to communicate with external camera modules acquiring external images including the robot that is being driven, a drive-information acquiring unit configured to acquire driving related information at the time of driving the robot, a driving unit configured to drive the robot, and a control unit configured to control the driving unit using external information including the external images received from the external camera modules and the driving related information.

11 Claims, 8 Drawing Sheets

(51) Int. Cl.
*G06N 3/08* (2006.01)
*H04L 67/125* (2022.01)

(52) U.S. Cl.
CPC ............ *G05D 1/0289* (2013.01); *G06N 3/08* (2013.01); *H04L 67/125* (2013.01)

(56) References Cited

U.S. PATENT DOCUMENTS

| | | | |
|---|---|---|---|
| 10,678,253 B2 * | 6/2020 | Zeng | B60W 50/14 |
| 11,090,810 B2 * | 8/2021 | Harada | B25J 9/1697 |
| 2017/0176999 A1 * | 6/2017 | Bobda | G05D 1/0297 |
| 2017/0252925 A1 | 9/2017 | Cho | |
| 2018/0232839 A1 | 8/2018 | Heinla et al. | |
| 2020/0023523 A1 * | 1/2020 | Uezu | B25J 9/1676 |
| 2020/0094997 A1 * | 3/2020 | Menon | B65B 57/14 |

FOREIGN PATENT DOCUMENTS

| | | | | |
|---|---|---|---|---|
| KR | 10-2018-0023301 A | 3/2018 | | |
| KR | 10-1887637 B1 | 8/2018 | | |
| WO | WO-2019180700 A1 * | 9/2019 | ............ | B60W 50/04 |

\* cited by examiner

[FIG. 1]
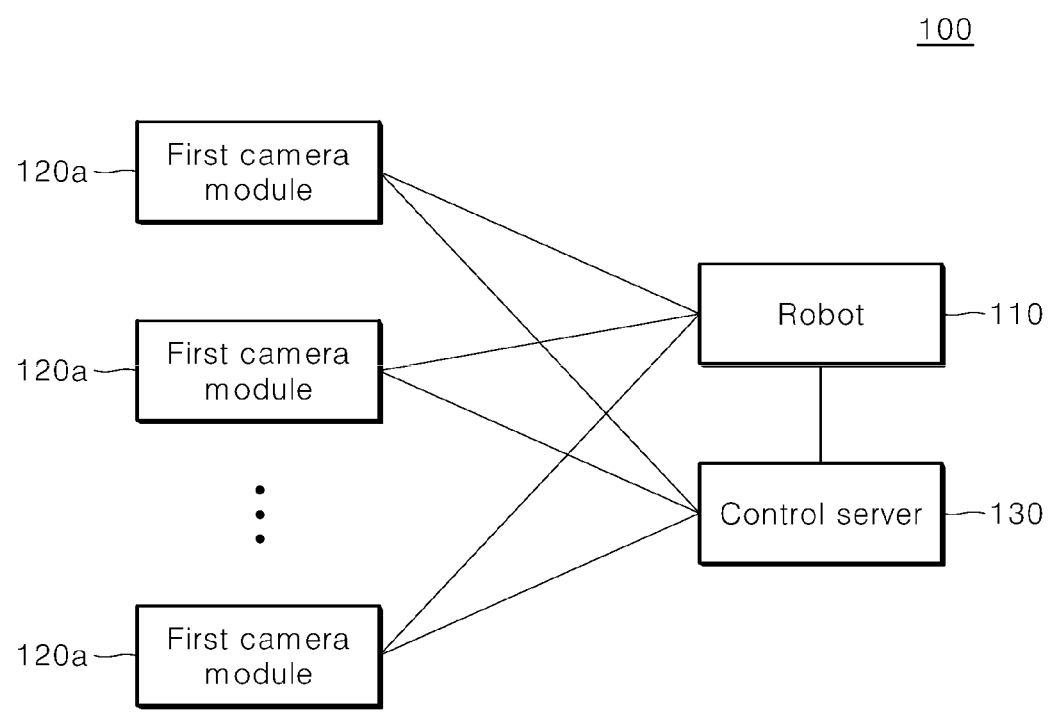

[FIG. 2]
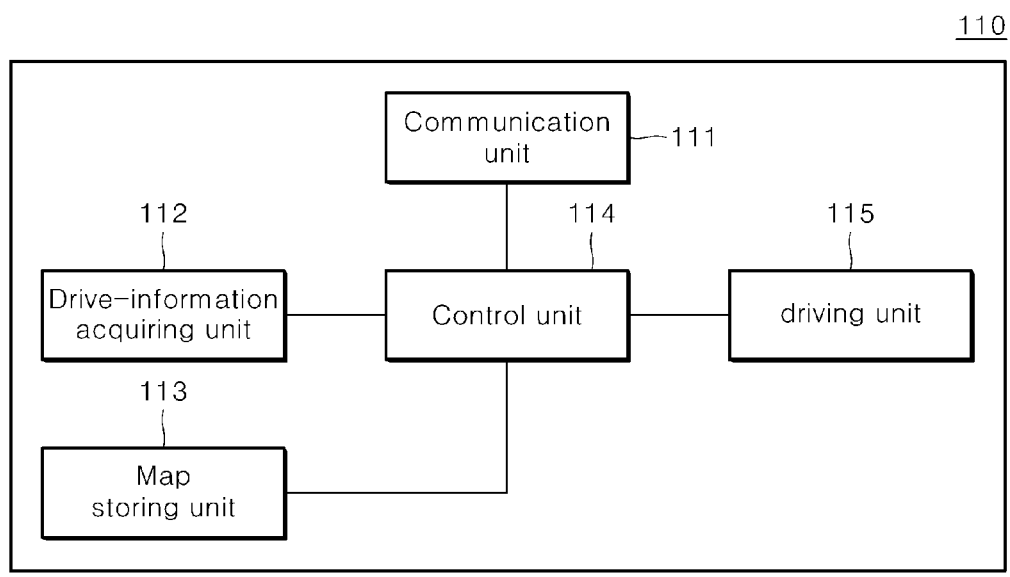

[FIG. 3]
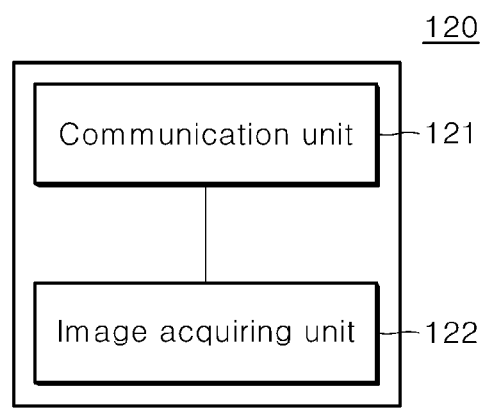

[FIG. 4]
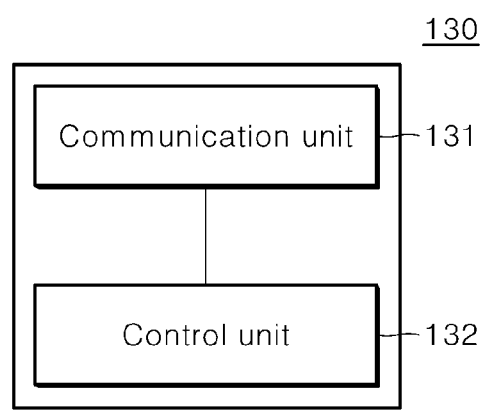

[FIG. 5]
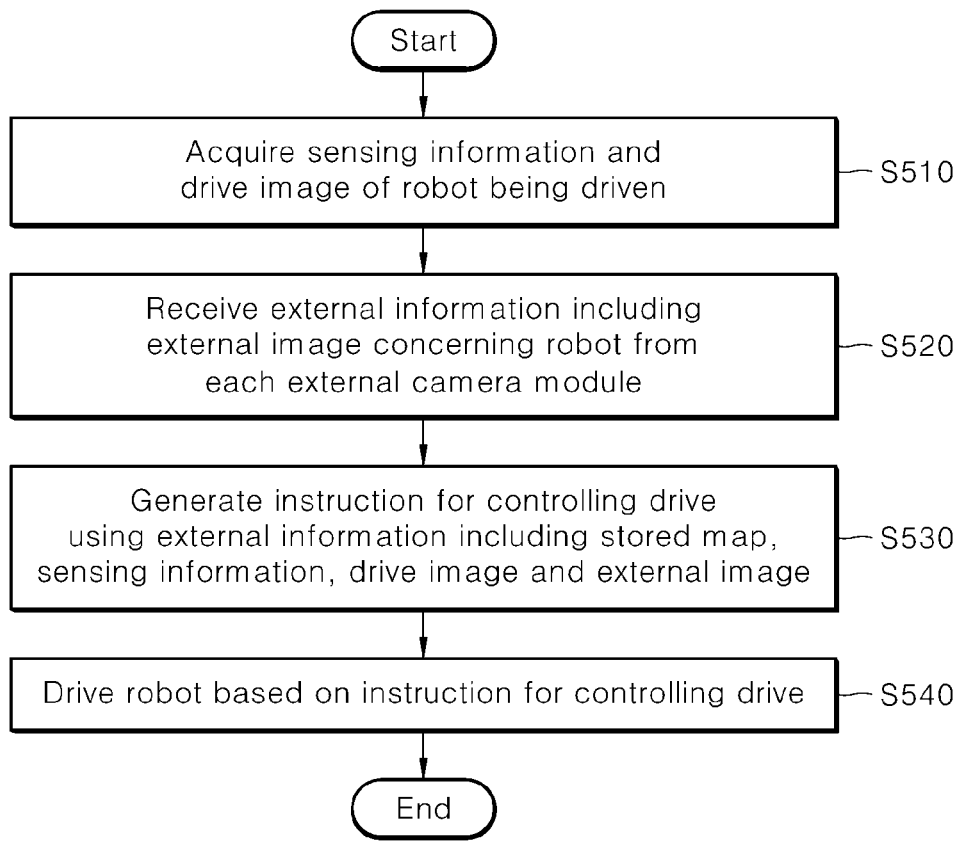

[FIG. 6]
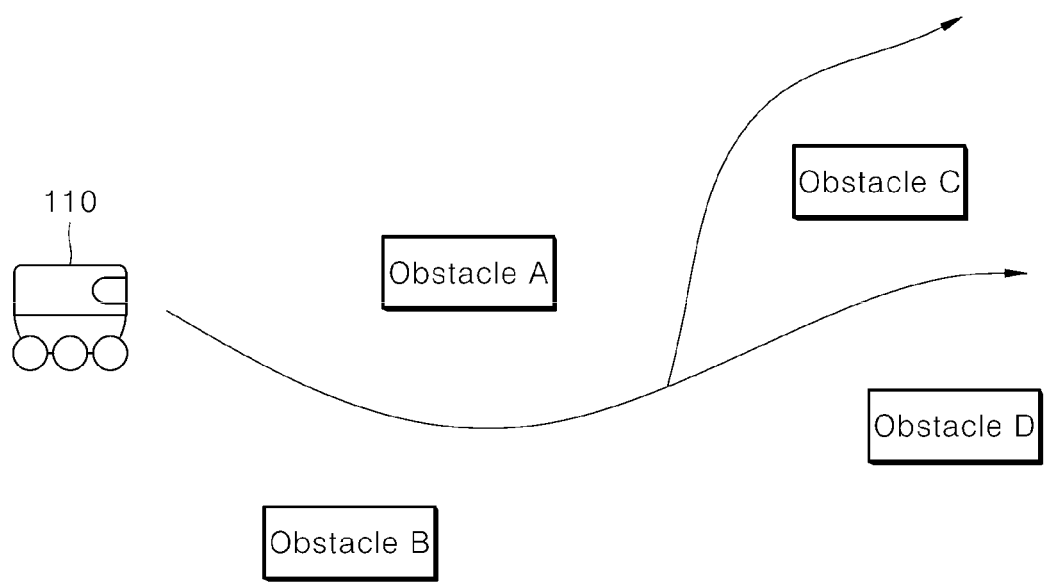

[FIG. 7]
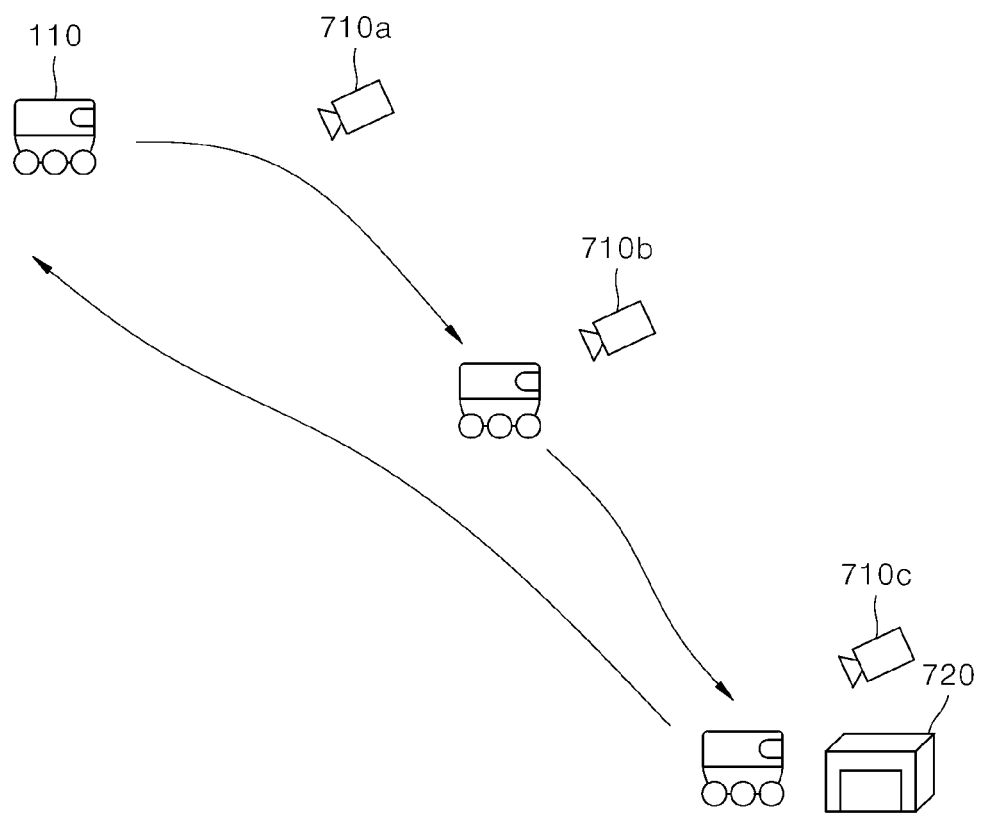

[FIG. 8]
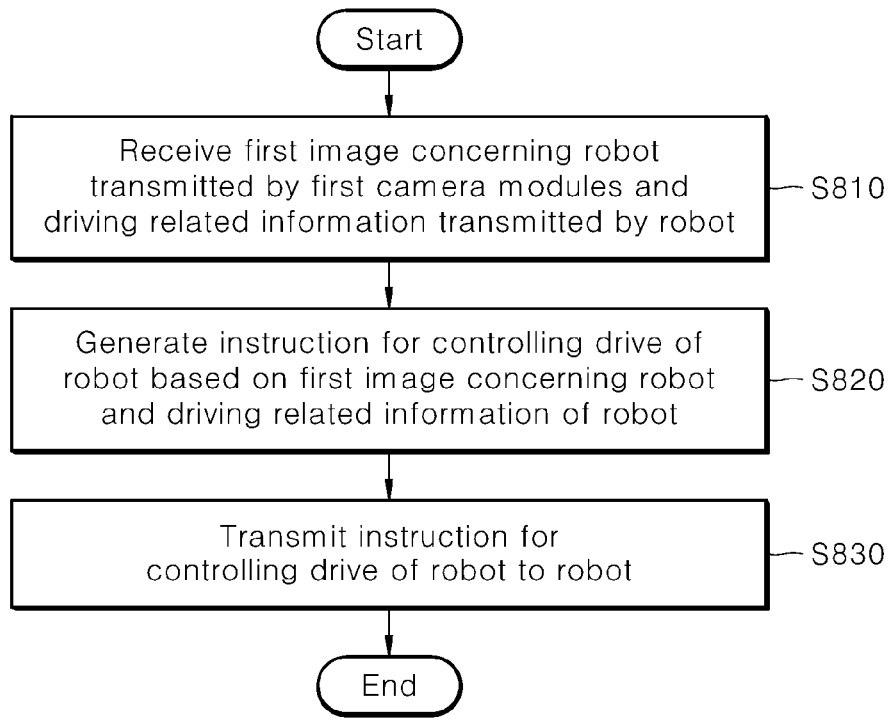

METHOD FOR DRIVING ROBOT BASED ON EXTERNAL IMAGE, AND ROBOT AND SERVER IMPLEMENTING THE SAME

CROSS-REFERENCE TO RELATED APPLICATION

This application claims priority to and the benefit of Korean Patent Application No. 10-2019-0067516, filed in the Republic of Korea on Jun. 7, 2019, the disclosure of which is incorporated herein by reference in its entirety.

BACKGROUND

1. Field of the Invention

The present disclosure relates to a method for driving a robot based on an external image, and a robot and a server implementing the same.

2. Description of Related Art

A moving robot moves autonomously or is driven under the control of a management server, and performs various functions such as delivery, cleaning and the like.

In this case, a camera module and a plurality of sensors are attached to the moving robot, and a moving path is set using an image acquired from the camera module and various pieces of sensing information acquired by the plurality of sensors. During the process, the moving robot may store information on objects placed in a space or information on the structure of a space on a map, and may set a moving path further using the stored map.

US Patent Application No. 2018-0232839 A1 discloses a method for using a moving robot for delivery. In the method, a server transmits an instruction concerning delivery including information on a final delivery position to a moving robot, and the moving robot loads a parcel and delivers the loaded parcel to the final delivery position.

A moving robot for delivery has to move in a random environment. However, a usual way of driving a robot using a camera module and a plurality of sensors that are attached to the robot makes it hard for the robot to perform delivery exactly. Specifically, the function such as simultaneous localization and mapping (SLAM) may not be properly performed in crowded places such as a residential area, an apartment complex, a shopping mall and the like that are a final delivery position.

SUMMARY OF THE INVENTION

The objective of the present disclosure is to provide a method for driving a robot, and a robot and a server implementing the same in which drive of the robot may be exactly controlled in a crowded area when the robot is used for delivery.

Additionally, the objective of the present disclosure is to provide a method for driving a robot, and a robot and a server implementing the same in which drive of the robot is controlled using an external image acquired by an external camera module that is installed inside or outside a building.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

A robot that is driven on the basis of an external image according to an embodiment includes a communication unit that communicates with external camera modules acquiring an external image including the robot that is being driven; a drive-information acquiring unit that acquires driving related information at the time of driving the robot, a driving unit that drives the robot; and a control unit that controls the driving unit using external information including the external images received from the external camera modules and the driving related information, wherein the communication unit receives first external information from a first external camera module among the external camera modules, and the control unit controls the driving unit to drive the robot to a position where a second external camera module among the external camera modules is installed using the first external information.

A control server that controls drive of the robot according to an embodiment includes a communication unit that communicates with security camera modules installed inside or outside a building, and a robot, and a control unit that generates an instruction for controlling drive of the robot on the basis of a security image concerning the robot received from the security camera modules and driving related information of the robot received from the robot, wherein the communication unit receives a first security image from a first security camera module among the security camera modules, and the control unit generates a control instruction to drive the robot to a position where a second external camera module among the external camera modules is installed using the first external information, and the communication unit transmits the instruction for controlling drive to the robot.

A method for driving a robot based on an external image according to an embodiment includes acquiring sensing information and a drive image concerning a robot that is being driven by a drive-information acquiring unit, receiving external information including external images concerning the robot from external camera modules by a communication unit, generating an instruction for controlling drive using the sensing information, the drive image and the external information by a control unit, driving the robot based on the instruction for controlling drive by a driving unit, wherein in the step of receiving external information, first external information is received from a first external camera module among the external camera modules, and in the step of generating an instruction for controlling drive, the instruction for controlling drive is generated using the first external information such that the robot moves to a position in which a second external camera module among the external camera modules is installed.

According to the present disclosure, a robot may be exactly driven by further using external images acquired from external camera modules of the robot.

Additionally, according to the present disclosure, a robot may be precisely driven even in crowded places such as a residential area, an apartment complex, a shopping mall and the like.

Effects of the present disclosure are not limited to what has been described, and various effects may be readily drawn from the configuration of the disclosure by one having ordinary skill in the art.

BRIEF DESCRIPTION OF THE DRAWINGS

FIG. 1 is a view illustrating a schematic configuration of a robot driving system according to an embodiment.

FIG. 2 is a view illustrating a schematic configuration of a robot according to an embodiment.

FIG. 3 is a view illustrating a schematic configuration of a first camera module according to an embodiment.

FIG. 4 is a view illustrating a schematic configuration of a control server according to an embodiment.

FIG. 5 is a flow chart illustrating a method for driving a robot according to a first embodiment.

FIG. 6 is a view illustrating information on a guide of a moving path in the form of an image according to the present disclosure.

FIG. 7 is a view illustrating an example of a driving operation of a robot using three external camera modules according to the present disclosure.

FIG. 8 is a flow chart illustrating a method for driving a robot according to a second embodiment.

DETAILED DESCRIPTION OF THE INVENTION

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

Below, embodiments of the present disclosure are specifically described with reference to the attached drawings.

FIG. 1 is a view illustrating a schematic configuration of a robot driving system according to an embodiment.

Referring to FIG. 1, a robot driving system 100 includes a robot 110, a plurality of first camera modules 120, and a control server 130.

The robot 110 is a moving robot that may be driven and specifically, may be a delivery robot that delivers a parcel from a shipping point to a delivery point. Two or more robots may be present in the robot driving system 100, and the drive of each of two or more robots may be controlled with the same method.

The first camera modules 120 are camera modules that are installed inside or outside buildings, and acquire a first image that is an image of the state in which the robot 110 is being driven. As an example, the first camera modules 120 may be a security camera for buildings (closed circuit TV and the like), and the first image may be a security image.

Suppose that each of the first camera modules 120 includes a communication module for communicating with another external device, therein, or that each of the communication modules in a location adjacent to the first camera module 120 makes a wired connection with the first camera module 120, and that each of the first camera modules 120 is previously registered with the robot 110 and the control server 130.

The control server 130 may be a computer functioning as a sort of server, may create a drive control instruction for remotely controlling the robot 110 and may supply the instruction to the robot 110, and may generate at least one of the information on a guide of a moving path of the robot 110 from a first position to a second position that are described hereunder and the additional information on control of operations of the robot 110 and may supply the information to each of the first camera modules.

According to an embodiment, the robot 110 may move autonomously, and the drive of the robot 110 may be remotely controlled on the basis of a drive control instruction transmitted by the control server 130. Below, structures of the robot 110 and the control server 130, and a method for driving the robot 110 on the basis of the structures are specifically described with reference to the attached drawings.

FIG. 2 is a view illustrating a schematic configuration of a robot 110 according to an embodiment.

Referring to FIG. 2, the robot 110 according to an embodiment includes a communication unit 111, a drive-information acquiring unit 112, a map storing unit 113, a control unit 114, and a driving unit 115.

The communication unit 111 communicates with the first camera modules 120 and the control server 130. For example, the communication unit 111 may include a short-range communication module such as Bluetooth module, NFC module, WIFI module and the like, and a long-range communication module such as LTE communication module, 5G communication module and the like.

The first camera modules 120 are placed outside the robot 110. From the perspective of the robot 110, the first camera modules 120 may be external camera modules, and a first image acquired by each of the first camera modules 120 may be an external image acquired with respect to the robot 110.

The drive-information acquiring unit 112 acquires driving related information at the time of driving the robot 110.

As an example, the drive-information acquiring unit 112 may include a plurality of sensors and a second camera module that are attached to the robot 110. The plurality of sensors sense the surroundings of the robot 110, detects objects placed in front of the robot 110 and by doing so, acquires sensing information. The second camera module acquires a second image that is an image of forward drive of the robot that is being driven. Accordingly, driving related information acquired by the drive-information acquiring unit 112 includes the sensing information and the second image.

The map storing unit 113 stores a map that is previously created. The map is used when the robot 110 is driven.

The control unit 114 may be a processor-based module, and controls the driving unit 115 using a stored map, driving related information, and external information received from each of the first camera modules 120 or an instruction for controlling drive received from the control server 130.

In this case, the external information may include a first image acquired by the first camera module 120, and may optionally include at least one of the information on a guide of a moving path from a first position to a second position and the additional information on control of operations of the robot 110 at the second position. Additionally, a below-described drive control instruction may be created by the control sever 130 based on the first image.

The driving unit 115 drives the robot 110 on the basis of control by the control unit 114.

FIG. 3 is a view illustrating a schematic configuration of a first camera module 120 according to an embodiment.

Referring to FIG. 3, the first camera module 120 according to an embodiment includes a communication unit 121, and an image acquiring unit 122.

The communication unit 121 communicates with the robot 110 and the control server 130. For example, the communication unit 121 may include a short-range communication module such as Bluetooth module, NFC module, WIFI module and the like, and a long-range communication module such as LTE communication module, 5G communication module and the like.

The image acquiring unit 122 acquires a first image concerning the robot 110. The first image includes the appearance of the robot 110 that is being driven and information on the surroundings of the robot 110 that is being driven.

FIG. 4 is a view illustrating a schematic configuration of a control server 130 according to an embodiment.

Referring to FIG. 4, a control server 130 according to an embodiment includes a communication unit 131 and a control unit 132.

The communication unit 131 communicates with the robot 110 and the first camera modules 120. For example, the communication unit 131 may include a short-range communication module such as Bluetooth module, NFC module, WIFI module and the like, and a long-range communication module such as LTE communication module, 5G communication module and the like.

The control unit 132 may be a processor-based module.

When drive of the robot 110 is remotely controlled, the control server creates an instruction for controlling drive of the robot 110 based on the first image received from each of the first camera modules 120 and based on the driving related information of the robot 110 received from the robot 110. The instruction for controlling drive is transmitted to the robot 110 through the communication unit 131.

Additionally, when the robot 110 moves autonomously, the control unit 132 may generate information on a guide of a moving path to the first position and the second position and additional information, and the generated information on a guide of a moving path and the additional information are transmitted to the plurality of first camera modules 120 through the communication unit 131.

In short, the robot 110 may move autonomously or may be driven remotely, and the drive of the robot 110 is controlled further based on the first image acquired from each of the first camera modules 120.

In other words, when the robot 110 moves autonomously, the control unit 114 controls the driving unit 115 further using the first image that is an external image acquired from each of the first camera modules 120 which are external camera modules, together with information for drive (i.e., stored map, sensing information, image of forward drive), which is conventionally used.

When the drive of the robot 110 is remotely controlled, the control unit 114 controls the driving unit 115 by receiving an instruction for controlling drive generated on the basis of the first image from the control server 130, together with information for drive (i.e., stored map, sensing information, image of forward drive), which is conventionally used.

Below, the operation of drive when the robot 110 performs the operation of delivery is specifically described with reference to the following drawings.

FIG. 5 is a flow chart illustrating a method for driving a robot 110 according to a first embodiment.

In the method of FIG. 5, steps of the operation of delivery drive are illustrated when the robot 110 autonomously moves, and for convenience of description, the first camera module is referred to as an "external camera module", the second camera module as an "inner camera module", the first image as an "external image" and the second image as a "drive image". Below, the process of performing each step is described.

First, a drive-information acquiring unit 112 of a robot 110 acquires sensing information and a drive image concerning the robot that is being driven (S510). The sensing information is acquired by a plurality of sensors attached to the robot 110, and the drive image is acquired by an inner camera module attached to the robot 110.

Next, a communication unit 111 of the robot 110 receives external information including an external image concerning the robot 110 from each of the external camera modules 120 (S520).

FIG. 5 illustrates that step 520 is performed after step 510. However, step 520 may be performed prior to step 510.

Next, a control unit 114 of the robot 110 generates an instruction for controlling drive using the external information including a stored map, sensing information, a drive image and an external image (S530), and a driving unit 115 of the robot 110 drives the robot 110 based on the instruction for controlling drive (S540).

In short, drive of the robot 110 according to the present disclosure is controlled further using external images acquired from each of the external camera modules. Accordingly, the drive of the robot 110 may be more precise than drive of a robot using only information for drive (i.e., stored map, sensing information, image of forward drive) which is conventionally used.

The robot 110 may receive external information from all the external camera modules but may receive external information only from a single external camera module in a specific time range. That is, according to an embodiment, the robot 110 may communicate only with a single external camera module 120 in a single time range. In other words, the robot 110 may communicate with external camera module A in time range A, and communicate with external camera module B in time range B, and the robot 110 may communicate only with a single external camera module even in another time range.

In this case, according to an embodiment, when the communication unit 111 connects with a first external camera module among external camera modules and receives first external information, the control unit 114 may control the driving unit 115 using the first external information such that the robot 110 may move from a position in which the first external camera module is installed to a position in which a second external camera module is installed.

The second external camera module may be an external camera module that comes after the first external camera module. As an example, when the robot 110 moves to a delivery point, the second external camera module may be a camera module closest to the first external camera module among external camera modules that are placed between the position of the first external camera module and the delivery point. As another example, when the robot 110 returns from the delivery point, the second external camera module may be a camera module closest to the first external camera module among the external camera modules that are placed between the position of the first external camera module and a shipping point.

Additionally, the first external information may include only an external image, and may further include information on a guide of a moving path between the position in which the first external camera module is installed and the position in which the second external camera module is installed. The control unit 114 may control the drive of the robot 110 more exactly and stably by further using information on a guide of a moving path together with an external image.

The information on a guide of a moving path may be image information that is supplied in the form of vector on a map. FIG. 6 illustrates information on a guide of a moving path in the form of an image.

Additionally, when the first external camera module is an external camera module closest to the delivery point of the robot 110, the first external information may further include additional information on operations of the robot, which are performed at the delivery point. As an example, the additional information may be an instruction for controlling the operation performed by the robot 110 of putting a parcel into a parcel storage box that is placed at the delivery point, and the like.

FIG. 7 is a view illustrating an example of a driving operation of a robot 110 using three external camera modules.

The robot 110 first connects with external camera module A 710a, and receives external information A including external image A from external camera module A 710a. The control unit 114 of the robot 110 analyzes external image A that is included in received external information A, and information on a guide of a moving path that is optionally included in received external information A, and controls the robot 110 such that the robot 110 is driven to a position in which external camera module B 710b is installed.

The robot 110, having moved to the position in which external camera module B 710b is installed, connects with external camera module B 710b, and receives external information B including external image B from external camera module B 710b. The control unit 114 of the robot 110 analyzes external image B that is included in received external information B, and information on a guide of a moving path that is optionally included in received external information B, and controls the robot 110 such that the robot 110 is driven to a position in which external camera module C 710c is installed.

The robot 110, having moved to the position in which external camera module C 710c is installed, connects with external camera module C 710c, and receives external information C including external image C from external camera module C 710c. In this case, external camera module C 710c is an external camera module adjacent to a delivery point. Accordingly, the control unit 114 of the robot 110 analyzes external image C that is included in received external information C, and information on a guide of a moving path and additional information that are optionally included in received external information C, and controls the robot 110 such that the robot 110 may put a parcel into a parcel storage box 720 and move to the position in which external camera module B 710b is installed so as to return to a shipping point.

Then, as described above, the robot 110 consecutively moves to the position in which external camera module B 710b is installed and then to the position in which external camera module A 710a is installed to return to the shipping point.

FIG. 8 is a flow chart illustrating a method for driving a robot 110 according to a second embodiment.

In the method of FIG. 8, steps of the operation of delivery drive are illustrated when drive of the robot 110 is remotely controlled. Below, the process of performing each step is described.

First, a communication unit 131 of a control server 130 receives a first image concerning a robot 110, which is transmitted by first camera modules 120, and driving related information transmitted by the robot 110 (S810).

Next, a control unit 132 of the control server 130 generates an instruction for controlling drive of the robot 110 based on the received first image concerning the robot and the driving related information of the robot 110 (S820).

Finally, the communication unit 131 of the control server 130 transmits the instruction for controlling drive of the robot 110 to the robot 110 (S830). Drive of the robot 110 is controlled on the basis of the instruction for controlling drive.

The operation of generating the instruction for controlling drive is similar to the operation of generating the instruction for controlling drive of control unit 114 of the robot 110 that is described above, and the drive operation of the robot 110 through the instruction for controlling drive is similar to the drive operation of the robot 110 that is described in FIGS. 5 to 7. Accordingly, detailed description is avoided.

Additionally, what is described in FIGS. 5 to 8 may be applied to drive of the robot 110 at a "shopping point" and a "delivery point" at which pre-registered first camera modules are installed. The robot 110 may move autonomously only using conventional information (i.e., sensing information, a forward drive image) in positions in which information including the first image is not received from the first camera modules, except the shipping point and the delivery point.

In short, according to the method for driving a robot 110, and the robot 110 and the control server 130 implementing the same of the present disclosure, drive of the robot 110 is controlled further using external images acquired from external camera modules. Accordingly, the robot 110 may be more exactly driven than the robot that is driven only using conventional information for drive, and specifically, the method of the present disclosure may be efficiently applied when the robot 110 is driven in crowded places such as a residential area, an apartment complex, a shopping mall and the like.

The control unit 114 of the robot 110, and the control unit 132 of the control server 130 may generate an instruction for controlling drive to control the driving unit 115 of the robot 110, using an artificial neural network-based algorithm model. Detailed description in relation to this is provided hereunder.

Artificial intelligence (AI) is a type of computer engineering and information technology that develop a method for giving a computer the abilities to think, to learn, to be self-developed and the like, which may be performed by humans, and allows computers to mimic human intelligence.

AI does not exist in itself, but is directly and indirectly linked to other fields of computer science. In a modern society, attempts to introduce the factor of artificial intelligence to various fields of information technology and to use the factor to solve problems in these fields have been made.

Machine learning is part of artificial intelligence and is an area that studies a technology for giving an ability to learn to a computer without explicit programs.

Specifically, machine learning is a technology for studying and establishing a system that may perform learning and prediction and may improve its performance based on empirical data, and an algorithm for the system. Algorithms of machine learning involve establishing a specific model to draw prediction or determination based on input data rather than performing functions based on static program instructions that are strictly determined.

The terms "machine learning" and "mechanical learning" are mixedly used.

Various machine learning algorithms have been developed on the basis of how to classify data in machine learning. Examples of machine learning algorithms include a decision tree, a Bayesian network, a support-vector machine (SVM), an artificial neural network (ANN) and the like.

Specifically, the artificial neural network models a theory of the operation of biological neurons and a connected relationship between neurons, and is an information processing system in which a plurality of neurons, which is a node or a processing element, are connected in the form of a layer.

That is, the artificial neural network is a model used in machine learning, and is a statistical learning algorithm, inspired by a neural network (brain in the central nerve system of animals) in biology, in machine learning and cognitive science.

Specifically, the artificial neural network may include a plurality of layers, and each of the layers may include a plurality of neurons. Additionally, the artificial neural network may include a synapse that connects a neuron and a neuron. That is, the artificial neural network may denote a model as a whole, in which artificial neurons, forming a network through a combination of synapses, have the ability to solve a problem by changing the intensity of the connection of synapses through learning.

The terms "artificial neural network" and "neural network" may be mixedly used, the terms "neuron" and "node" may be mixedly used, and the terms "synapse" and "edge" may be mixedly used.

The artificial neural network may be generally defined by an activation function for generating an output value from a total of the three following factors, i.e., (1) a pattern of a connection between neurons of other layers, (2) the process of learning the renewal of weights of synapses, and (3) weigh of an input received from a previous layer.

The artificial neural network may include network models such as a deep neural network (DNN), a recurrent neural network (RNN), a bidirectional recurrent deep neural network (BRDNN), a multilayer perceptron (MLP), a convolutional neural network (CNN) but is not limited.

The artificial neural network is classified as a single-layer neural network, and a multi-layer neural network based on the number of layers.

A usual single-layer neural network is comprised of an input layer and an output layer.

A usual multi-layer neural network is comprised of an input layer, one or more hidden layers and an output layer.

The input layer is a layer that accepts external data, and the number of neurons of the input layer is the same as the number of input variables.

The hidden layer is disposed between the input layer and the output layer, receives signals from the input layer to extract features, and delivers the features to the output layer.

The output layer receives signals from the hidden layer and outputs an output value based on the received signals. Input signals between neurons are multiplied by each weight (intensity of a connection) and then added up. When the total is greater than a threshold of the neurons, the neurons are activated and output an output value acquired through an activation function.

The deep neural network, including a plurality of hidden layers between the input layer and the output layer, may be a typical artificial neural network that implements deep learning, a type of machine learning.

The terms "deep learning" and "deep structured learning" may be mixedly used.

Artificial neural networks may be trained using training data. Training may denote a process of determining parameters of the artificial neural networks using learning data to achieve aims such as the classification, regression, clustering and the like of input data. Typical examples of parameters of the artificial neural network include weights of synapses or biases applied to neurons.

An artificial neural network trained using training data may classify or cluster input data based on patterns of the input data. In this specification, an artificial neural network trained using training data may be referred to as a trained model.

Next, a way of learning of artificial neural networks is described.

Learning methods of an artificial neural network may be broadly classified as supervised learning, unsupervised learning, semi-supervised learning, and reinforcement learning.

Supervised learning is a way of machine learning for inferring a single function from training data. In this case, outputting continuous values among inferred functions is referred to as regression, and predicting and outputting classes of input vectors is referred to as classification. That is, in supervised learning, an artificial neural network is trained in the state in which a label is given to training data. The label denotes the correct answer (or result value) that has to be inferred by an artificial neural network when training data is input to the artificial neural network.

Unsupervised learning is a way of machine learning, and a label is not given to training data. Specifically, unsupervised learning is a way of learning in which an artificial neural network is trained to find out patterns from training data itself rather than a connection between training data and labels corresponding to the training data to classify the training data.

Semi-supervised learning is a type of machine learning, and may denote a way of learning with all the training data that are given labels or that are not. As a type of the method of semi-supervised learning, after labels of training data that are not given labels are inferred, learning is performed using the inferred labels. The method may be useful when huge costs are incurred for labeling.

Reinforcement learning is a theory that the best way may be found out through experience without data if the environment in which an agent may determine what to do every moment is given.

Referring to the above description, an algorithm model based on an artificial neural network for generating an instruction for controlling drive according to the present disclosure includes an input layer comprised of input nodes, an output layer comprised of output nodes, and one or more hidden layers disposed between the input layer and the output layer and comprised of hidden nodes. In this case, the algorithm model is trained by learning data, and through learning, weights of edges that connect nodes and biases of nodes may be updated.

According to an embodiment, a trained algorithm model may be mounted onto the control unit 114 of the robot 110. In this case, external information including external images received from the first camera modules 120, and driving related information acquired by the drive-information acquiring unit 112 may be input to the input layer of the trained algorithm model, and an instruction for controlling drive may be output to the output layer of the trained algorithm model.

According to another embodiment, a trained algorithm model may be mounted onto the control unit 132 of the control server 130. In this case, external images received from the first camera modules 120, and driving related information of the robot 110 received from the robot 110 may be input to the input layer of the trained algorithm model, and an instruction for controlling drive may be output to the output layer of the trained algorithm model.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

| [Description of the Symbols] | | |
|---|---|---|
| i. | 100: Robot driving system | 110: Robot |
| ii. | 120: First camera module | 130: Control server |

What is claimed:

1. A robot which is to be driven based on an external image and delivers a parcel, the robot comprising:
   a communicator configured to communicate with external camera modules based on short-range wireless communication technology;
   a plurality of sensors and/or an internal camera module configured to acquire driving related information at the time of driving the robot;
   a driver configured to drive the robot; and
   a controller configured to control the driver based on external information received from the external camera modules and the driving related information,
   wherein the communicator is configured to receive first external information from a first external camera module among the external camera modules,
   wherein the first external information includes first external images concerning the robot acquired by the first external camera module and information on a guide of a moving path between a first position and a second position,
   wherein the first external camera module is installed in the first position and a second external camera module among the external camera modules is installed in the second position,
   wherein the second external camera module is located closest to the first external camera module between the first external camera module and a preset destination,
   wherein, in case that the first external camera module is an external camera module located closest to a delivery point, the first external information further includes additional information which corresponds to an instruction for controlling an operation performed by the robot of putting the parcel into a parcel storage box that is placed at the delivery point,
   wherein the controller is configured to control the driver to drive the robot from the first position to the second position based on the first external images, the information on the guide of the moving path and the driving related information, and
   wherein the controller is further configured to control the driver to put the parcel into the parcel storage box based on the additional information.

2. The robot of claim 1, wherein the information on the guide of a moving path is supplied on a map of the moving path in the form of a vector.

3. The robot of claim 1, wherein the plurality of sensors acquire sensing information that correspond to the driving related information and the internal camera module acquires a drive image that corresponds to the driving related information.

4. The robot of claim 1, wherein the controller is configured to generate an instruction for controlling driving by the driver, using an algorithm model based on an artificial neural network, and
   wherein the algorithm model comprises an input layer comprised of input nodes, an output layer comprised of output nodes, and one or more hidden layers disposed between the input layer and the output layer and comprised of hidden nodes, and weight of an edge that connects nodes and a bias of the nodes are updated through learning.

5. The robot of claim 4, wherein the external information and the driving related information are input to an input layer of the trained algorithm model, and the instruction for controlling drive is output to an output layer of the trained algorithm model.

6. The robot of claim 1, wherein the controller of the robot is further configured to analyze the first external images to determine and avoid obstacles in the moving path.

7. A method for driving a robot based on an external image, the method comprising:

acquiring sensing information and a drive image concerning the robot that is being driven by using a plurality of sensors and an internal camera module;

receiving external information from external camera modules based on short-range wireless communication technology by using a communicator;

generating an instruction for controlling drive based on the sensing information, the drive image and the external information by using a controller; and driving the robot based on the instruction for controlling drive by using a driver, wherein in the receiving external information, first external information is received from a first external camera module among the external camera modules, wherein the first external information includes first external images concerning the robot acquired by the first external camera module and information on a guide of a moving path between a first position and a second position, wherein the first external camera module is installed in the first position and a second external camera module among the external camera modules is installed in the second position, wherein the second external camera module is located closest to the first external camera module between the first external camera module and a preset destination, wherein, in case that the first external camera module is an external camera module located closest to a delivery point, the first external information further includes additional information which corresponds to an instruction for controlling an operation performed by the robot of putting the parcel into a parcel storage box that is placed at the delivery point, wherein in the generating an instruction for controlling drive, the instruction for controlling drive is generated based on the sensing information, the drive image, the first external images and the information on the guide of a moving path so that the robot moves from the first position to the second position, and wherein in the generating an instruction for controlling drive, the instruction for controlling drive is further generated based on the additional information so that the robot puts the parcel into the parcel storage box.

8. The method of claim 7, wherein the information on the guide of a moving path is supplied on a map of the moving path in the form of a vector.

9. The method of claim 7, wherein in the generating an instruction for controlling drive, the instruction for controlling drive is generated using an algorithm model based on an artificial neural network, and wherein the algorithm model includes an input layer comprised of input nodes, an output layer comprised of output nodes, and one or more hidden layers disposed between the input layer and the output layer and comprised of hidden nodes, and weight of an edge that connects nodes and a bias of the nodes are updated through learning.

10. The method of claim 9, wherein the external information and the driving related information are input to an input layer of the trained algorithm model, and the instruction for controlling drive is output to an output layer of the trained algorithm model.

11. The method of claim 7, wherein the first external images are analyzed by the controller of the robot to determine and avoid obstacles in the moving path.

* * * * *